(12) United States Patent
Kutaragi et al.

(10) Patent No.: US 6,816,972 B1
(45) Date of Patent: Nov. 9, 2004

(54) DISK RECORDING MEDIUM, REPRODUCTION DEVICE AND METHOD FOR PERFORMING REPRODUCTION ON DISK RECORDING MEDIUM

(75) Inventors: Ken Kutaragi, Kanagawa (JP); Eiji Kawai, Tokyo (JP); Kazuo Miura, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/550,848

(22) Filed: Apr. 17, 2000

(30) Foreign Application Priority Data

Apr. 21, 1999 (JP) .......................... P11-114168

(51) Int. Cl.[7] .......................... G06F 11/30; G06F 12/14; H04L 9/00; H04L 9/32
(52) U.S. Cl. .................. 713/200; 380/200; 380/201; 380/202; 380/203; 369/47.52
(58) Field of Search .................... 380/200, 201, 380/202, 203

(56) References Cited

U.S. PATENT DOCUMENTS

| | | | | |
|---|---|---|---|---|
| 4,837,644 A | * | 6/1989 | Yunoki | 360/66 |
| 5,513,169 A | | 4/1996 | Fite et al. | |
| 5,646,993 A | * | 7/1997 | Aizawa | 705/57 |
| 5,654,950 A | | 8/1997 | Itoh | |
| 5,671,202 A | | 9/1997 | Brownstein et al. | |
| 5,896,454 A | | 4/1999 | Cookson et al. | |
| 5,930,825 A | | 7/1999 | Nakashima et al. | |
| 6,122,739 A | | 9/2000 | Kutaragi et al. | |

FOREIGN PATENT DOCUMENTS

| | | | |
|---|---|---|---|
| EP | 0 704 844 A1 | 4/1996 | |
| JP | 59-17655 | 1/1984 | |
| JP | 60-196862 | 10/1985 | |
| JP | 3-263618 | 11/1991 | |
| JP | 3-266051 | 11/1991 | |
| JP | 5-181753 | 7/1993 | |
| JP | 06-208760 | * 7/1994 | ........... G11B/20/10 |
| JP | 7-44376 | 2/1995 | |
| JP | 7-262001 | 10/1995 | |
| JP | 7-287655 | 10/1995 | |
| JP | 8-147704 | 6/1996 | |
| JP | 10-011282 | 1/1998 | |
| JP | 10-162495 | 6/1998 | |

OTHER PUBLICATIONS

Translation of JP 06–208760 (attached to JP–06208760).*

* cited by examiner

*Primary Examiner*—Gilberto Barron
*Assistant Examiner*—Joseph M McArdle
(74) *Attorney, Agent, or Firm*—Katten Muchin Zavis Rosenman

(57) ABSTRACT

A device and method for protection of legitimate software against used software and counterfeit software in recording media. The device includes a disk is set in a main unit. A specific title code is read, and if this title code has been registered, the main unit shifts to a normal operation. If the code has not been registered, verification software is initiated, PG detection is performed, and when a PG pattern and verification data match, the code is registered in the COCT. If matching does not occur, the disk is processed as illegitimate software.

16 Claims, 8 Drawing Sheets

DISK RECORDING MEDIUM, REPRODUCTION DEVICE AND METHOD FOR PERFORMING REPRODUCTION ON DISK RECORDING MEDIUM

BACKGROUND OF THE INVENTION

1. Field of the Invention

The present invention relates to a disk recording medium, a reproduction device, and a reproduction method, whereby a legitimate recording medium can be protected from the used recording medium market by the structure of the disk recording medium such as a CD-ROM and a main unit (reproduction device) in which this recording medium is installed.

2. Background of the Invention

In recent years, beginning with the popularity of videogame machines, numerous entertainment devices have circulated on a market, and accordingly, the demand for disk recording media such as video software has increased. In conjunction with this phenomenon, not only end-users purchase and use disk recording media by legitimate channels, but also the resale of disk recording media already purchased by the end-user, i.e., the purchase of the used software, occurs as well as the manufacture of so-called counterfeit software in which the recorded data is illegally copied.

In the past, as a countermeasure against the manufacture of counterfeit software of this type, a device has been adopted whereby a fixed pattern with a mark stating that this software is legitimate, recorded on the disk recording medium, and when this fixed pattern is not detected, reproduction cannot be performed on the disk recording medium, thus attempting to suppress the creation of counterfeit software.

Nevertheless, the prevention of the creation of counterfeit software by the detection of a fixed pattern can be easily defeated by creating a circuit that generates such fixed pattern, i.e., a security bypass circuit. Specifically, equipment and the like which disengage checks on software other than legitimate software are in circulation in order to allow counterfeit software to be reproduced, even using specialized equipment.

SUMMARY OF THE INVENTION

The present invention has been produced in light of the aforesaid problems. It is an object of the present invention to provide a disk recording medium for the protection of legitimate recorded media in which security is maintained so that the sale of used software and counterfeit software can be prevented. It is a further object of this invention to provide a medium reproduction device and reproduction method using that disk recording.

Objects of the present invention are attained by a disk recording medium in which software is recorded and which can be reproduced by means of a recording device, the disk recording medium having a specific code provided so as to correspond to each piece of software, verification data which is set to correspond to said software, and pulse data provided with pulse sequences corresponding to said verification data, in addition to said software.

Specific codes in the disk recording medium can be obtained by at least one of bar codes, digital signals, and servo error signals in which a pit deviation is modulated.

The pulse data may be composed of at least one among magnetic data and optical data.

The objects of the present invention are further attained by a disk recording medium in which software is recorded and which can be reproduced by means of a recording device, the disk recording medium having a specific code provided so as to correspond to each piece of software, verification data which is set to correspond to said software, pulse data provided with pulse sequences corresponding to said verification data, and a rotation control program which controls a rotational speed of the disk recording medium so as to match the pulse sequence according to said pulse data and said verification data, in addition to said software.

The specific codes of the disk recording medium can be obtained by at least one of bar codes, digital signals, and servo error signals in which a pit deviation is modulated.

The disk recording medium may have a program which controls a rotational speed of multiple stages is contained in said rotation control program, and data corresponding to the rotational speed of said multiple stages is contained in said verification data.

In an embodiment, the disk recording medium has a specific code provided so as to correspond to each piece of software, verification data which is set to correspond to said software, pulse data provided with pulse sequences corresponding to said verification data, a rotation control program which controls the rotational speed of the disk recording medium so as to match the pulse sequence according to said pulse data and said verification data, and a verification program which detects the pulse sequence according to said pulse data, determines whether the pulse sequence detected and the aforesaid verification data match, and when said sequence and said data match, registers the specific code in the reproduction device and then deletes the pulse data, in addition to the software.

The objects of the invention are also achieved by a reproduction device which performs reproduction of a disk recording medium into which software has been recorded, the reproduction device comprising means for installing a disk recording medium having a specific code provided so as to correspond to each piece of software, verification data which is set to correspond to the aforesaid software, and pulse data provided with pulse sequences corresponding to this verification data a specific code distinguishing means, which distinguishes whether the aforesaid specific code of the disk recording medium that has been installed has been registered, a pulse sequence detection means which detects a pulse sequence obtained from the aforesaid pulse data by the rotation of the aforesaid disk recording medium only when the aforesaid specific code has not been registered, specific code registration means which registers the aforesaid specific code only when the aforesaid detected pulse sequence and the aforesaid verification data match, and a deletion means which deletes the aforesaid pulse data when the aforesaid specific code has been registered.

The reproduction device may have a rotation control means which controls the rotation of the aforesaid disk recording medium so that the pulse sequence according to the aforesaid pulse data and the aforesaid verification data match.

In the aforesaid rotation control means, the rotation of the disk recording medium may be controlled so as to change in the multiple stages in accordance with the aforesaid verification data.

A method for performing reproduction is further on a disk recording medium in which software has been recorded, is further suggested which comprises provided a specific code so as to correspond to each piece of software, verification data which is set to correspond to the aforesaid software, and pulse data provided with pulse sequences corresponding to this verification data are recorded on the aforesaid disk recording medium, reading the specific code when the aforesaid disk recording medium has been installed in the aforesaid reproducing device, and determining whether this specific code has been registered in the aforesaid recording device detecting a pulse sequence obtained from the aforesaid pulse data by the rotation of the aforesaid disk recording medium only when the aforesaid specific code has not been registered, determining whether the detected pulse sequence and the aforesaid verification data match, and reading the aforesaid specific code is read and registering said code in the aforesaid reproduction device only when the detected pulse sequence and the verification data match, and the pulse data is deleted.

In the reproduction method of the present invention, when the disk recording medium has been installed in the recording device and a pulse sequence from the pulse data is detected, rotation control is performed so that the pulse sequence according to the pulse data and the verification data match.

The rotation control may be changed in multiple stages in conjunction with the verification data

DETAILED DESCRIPTION OF THE PREFERRED EMBODIMENTS

An example of a working mode of the present invention is explained referring to FIG. 1 through FIG. 8. In this instance, an entertainment system is used as an example.

Figure 1:
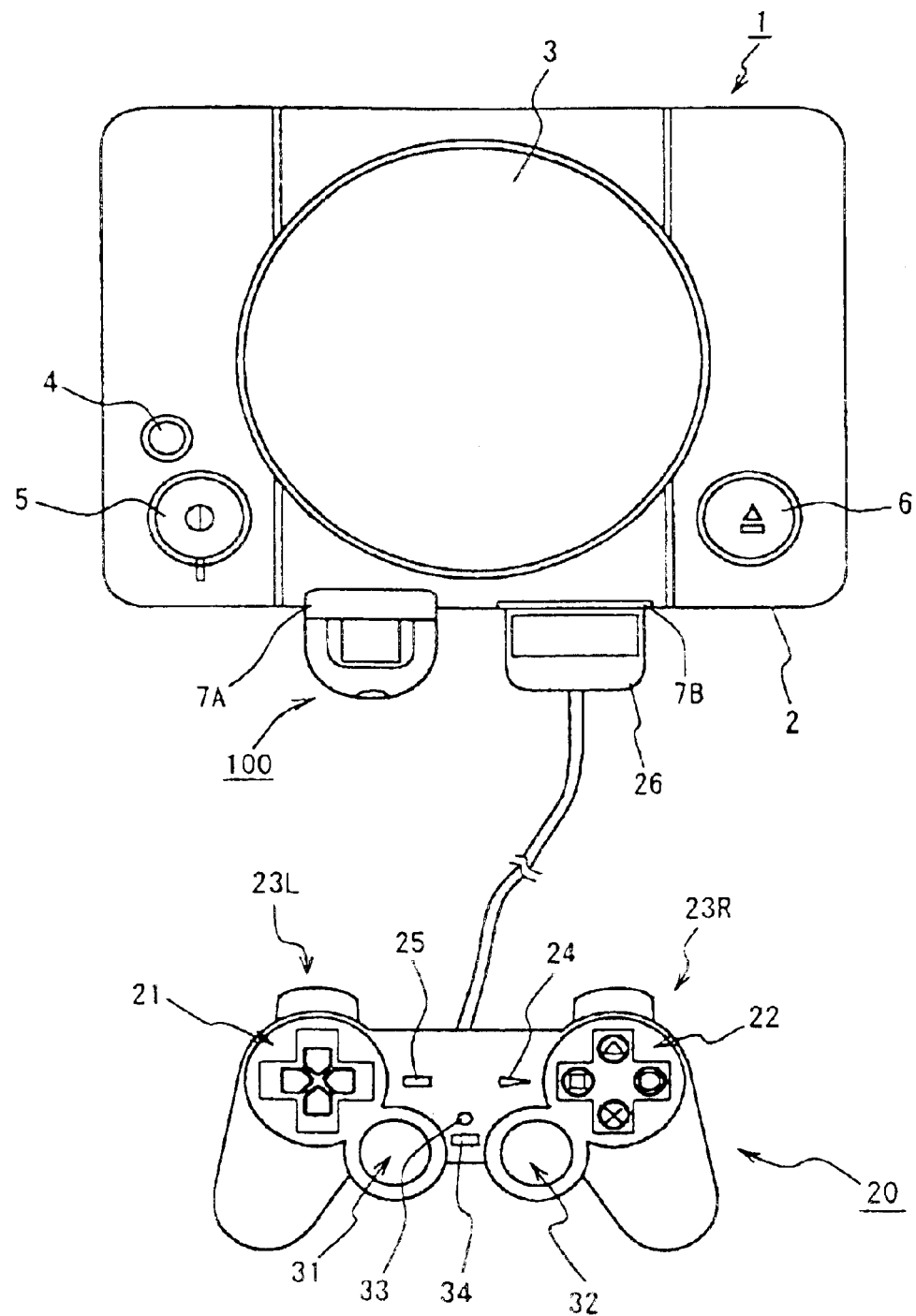
FIG. 1 is a diagrammatic plan view of an entertainment system according to the present invention.

First, an entertainment system 1 which uses a disk recording medium, a reproduction device and reproduction method of the present invention is shown in FIG. 1.

This entertainment device 1 reads out a program recorded on an optical disk, for example, and executes a game, for example, in accordance with directions from the user (e.g., game player). Here the term "execution of the game" refers mainly to controlling the progress of the game, display, voices, etc.

A main body 2 of the entertainment device 1 is housed in a roughly square case and has a disk installation part 3, into the center part of which an optical disk such as a CD-ROM, which serves as a recording medium for providing an application program such as a view game, is installed, a reset switch 4 for resetting as desired a program presently being executed, a power switch 5, a disk operating switch 6 for operating the installation of the aforesaid optical disk, and, for example, two slot parts 7A and 7B.

Two operating devices or controllers 20 can be connected to the slot parts 7A and 7B, allowing two users to operate a combat game, etc. Additionally, a conventionally used memory card or terminal 100 may be inserted into slot parts 7A and 7B. An example of the structure in which slot parts 7A and 7B of a dual system are provided is as shown in FIG. 1, but this number is not limited to a dual system The operating device 20 has first and second operating parts 21 and 22, a left-hand button 23L, a right-hand button 23R, a start button 24, and a selection button 25, and also has operating parts 31 and 32, which allow analog operation, a mode selection switch 33 which selects the operating mode of these operating parts 31 and 32, and a display part 34 which displays the operating mode that has been selected. A vibration generating mechanism not shown in figure is also provided inside the operating device 20.

Figure 2:
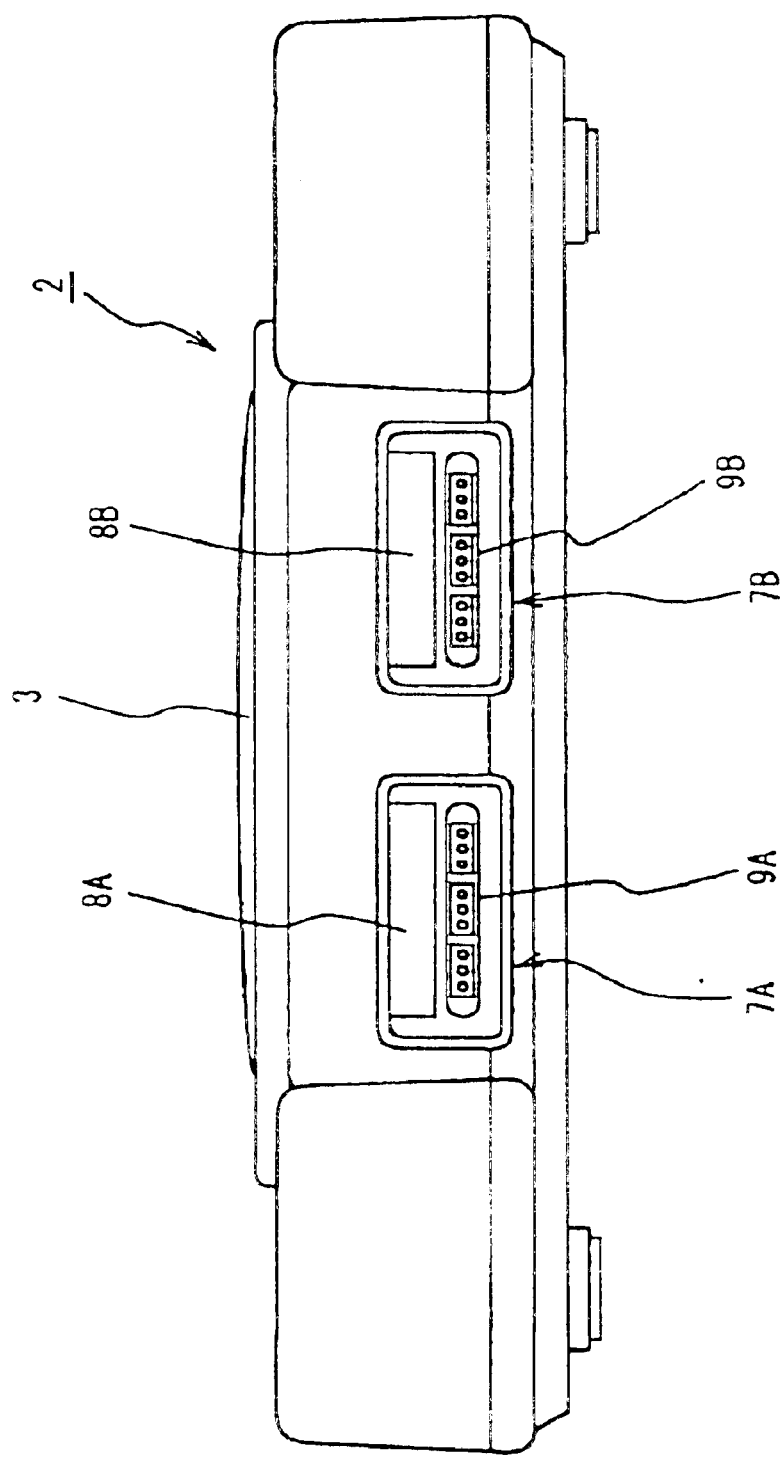
FIG. 2 is a front elevation view of a slot part of the entertainment device of FIG. 1.

FIG. 2 shows the form of the slot parts 7A and 7B provided on the front face of the main body 2 of the entertainment device 1.

In this working mode, slot parts 7A and 7B are each formed in two stages, with the upper stage provided with memory card insertion parts 8A and 8B, into which the aforesaid memory cards, terminal 100, etc., are inserted, and the lower stage provided with controller connection parts (jacks) 9A and 9B, to which the connecting terminal parts (connectors) 26 of a controller 20 are connected.

The insertion holes (slots) of the memory card insertion parts 8A and 8B are formed in a long, narrow form in the lateral direction, with the corners on both ends on the lower side more rounded than the corners on the upper ends, thereby having a configuration which prevents insertion of a memory card in the wrong direction. Additionally, the memory card insertion parts 8A and 8B are provided with shutters, which protect the connection terminals for obtaining electrical connection that are provided therein.

On the other hand, the controller connection parts 9A and 9B are formed so that the corners at both ends of the slots on the lower side, which have a long narrow form for extending in the lateral direction, are more rounded than the corners on the upper side, thereby having a configuration which prevents the insertion of a connector 26 of the controller 20 in the wrong direction, and the forms of the slots are different from the forms of the memory card insertion parts 8A and 8B in order to prevent the mistaken insertion of a memory card.

Figure 3:
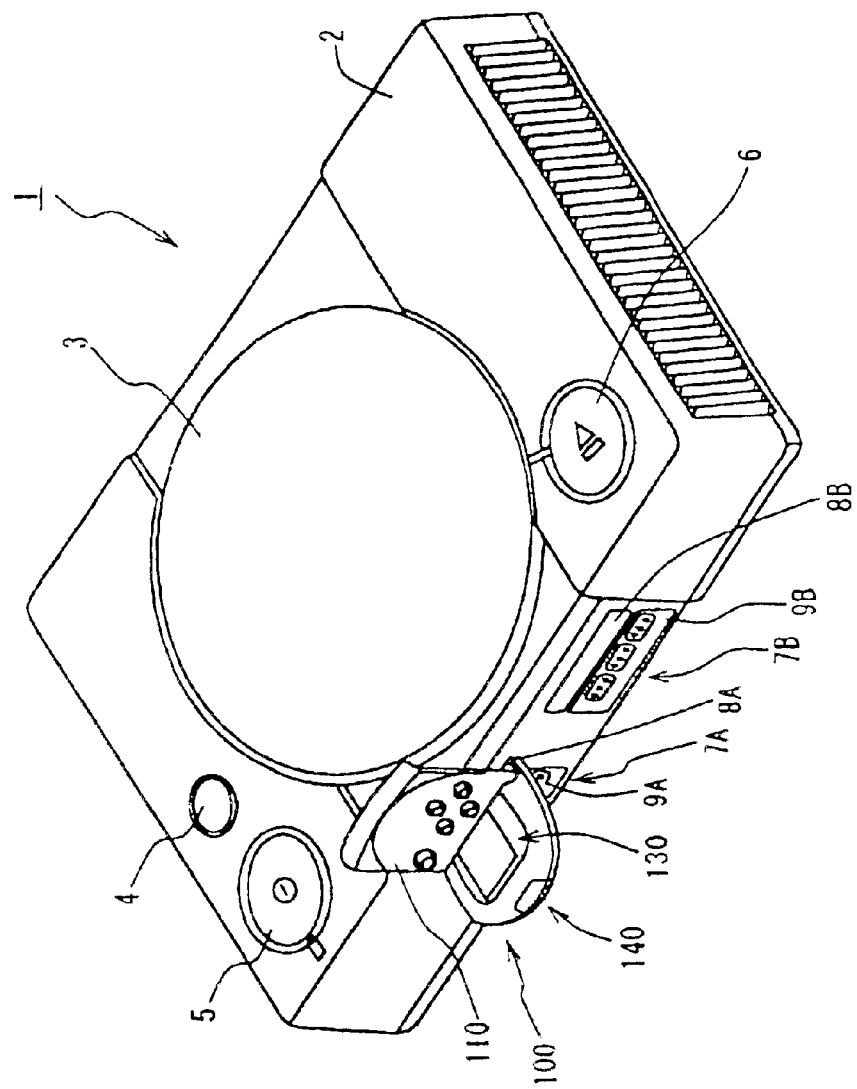
FIG. 3 is a perspective view of the entertainment device of FIG. 1.

FIG. 3 shows the position in which a terminal 100 is inserted into the memory card insertion part 8A of the slot part 7A on the front of the entertainment device.

Figure 4:
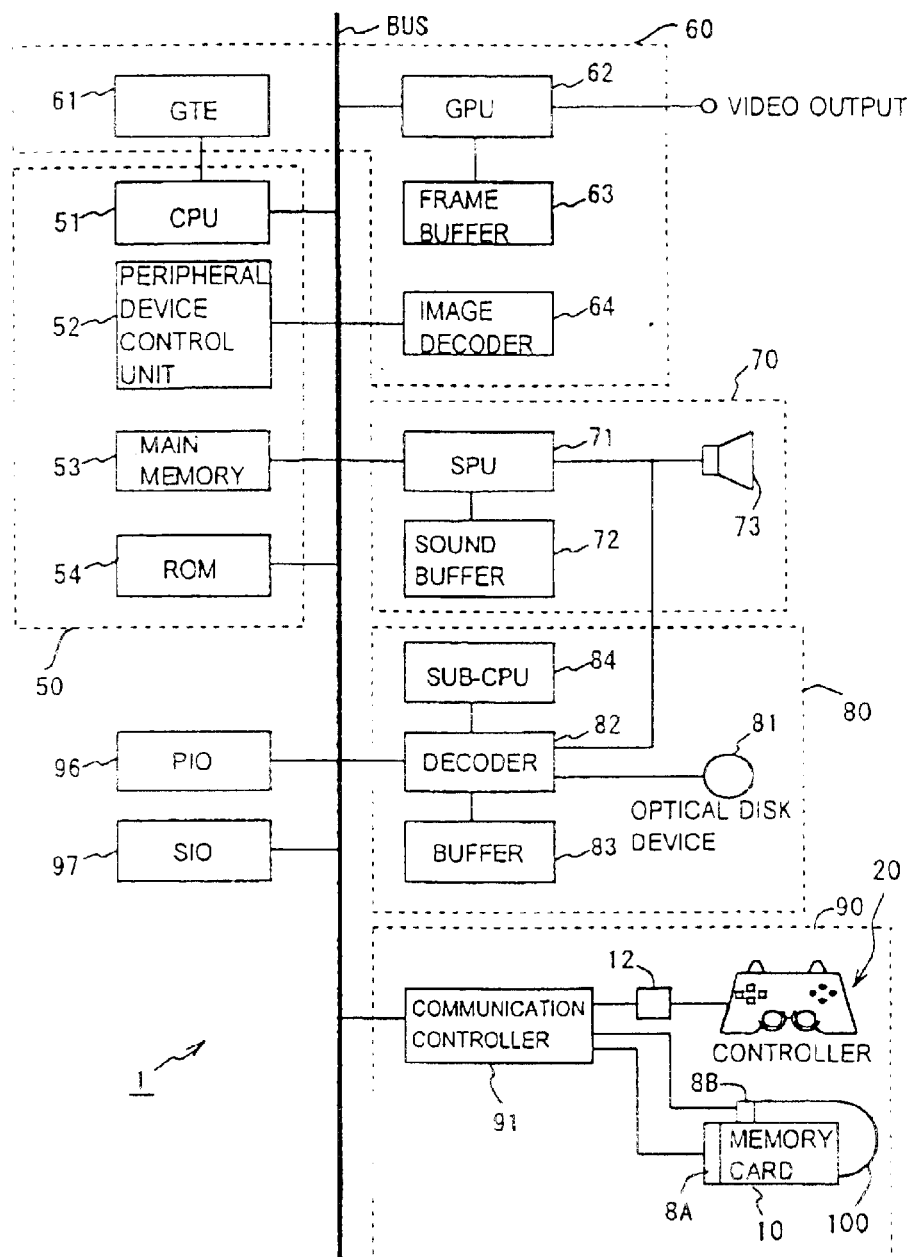
FIG. 4 is a block diagram of the structure of the entertainment device.

Next, the block configuration of the entertainment device 1 is explained referring to FIG. 4. This entertainment device 1 is constituted so as to be provided with a control system 50 comprising a central processing unit (CPU) 51 and its peripheral devices, etc., a graphics system 60 comprising a graphics processing unit (GPU) 62, which performs graphic processing in a frame buffer 63, a sound system 70 comprising a sound processing unit (SPU) 71, which generates music, sound effects, etc., an optical disk control part 80, which performs control on the optical disk in which the application program is recorded, a communications control part 90, which controls the input and output of signals from the controller 20, into which instructions are input by the user, and data from the memory card 10, the terminal 100, etc., in which game settings are stored, and a bus BUS, etc., through which the aforesaid parts are connected.

The control system 50 comprises a CPU 51, a peripheral device control part 52, which performs interrupt control and control of direct memory access (DMA) transmission, etc., a main memory 53 formed of the random access memory (RAM), and a read-only memory (ROM) 54 which stores programs such as the so-called operating program, which performs the management of the main memory 53, graphics system 60, sound system 70, etc. The term "main memory 53" here refers to a device which is able to execute programs on its memory.

The aforesaid CPU 51 controls the entertainment device 1 as a whole by executing the operating system stored in the ROM 54, and is composed of, for example, a 32-bit RISC (reduced instruction set computer)-CPU.

This entertainment device 1 is constituted so that, when the power is switched on, the CPU 51 of the aforesaid control system 50 operates the operating system stored in the ROM 54, and thereby the CPU 51 performs control of the aforesaid graphics system 60, sound system 70, etc. Additionally, when the operating system is operated, the CPU 51 first performs initialization of the entertainment device 1 as a whole, including operation verification, etc., and then executes an application program such as a game that is stored on an optical disk 80 by controlling the optical disk control part 80.

By executing the game or other program, the CPU 51 controls the graphics system 60, sound system 70, etc., in accordance with input from the user, and controls the display of images and the generation of sound effects and music.

The graphics system 60 comprises a geometry transfer engine (GTE) 61 which performs processes such as coordinate conversion, a GPU 62 which performs graphics processing in accordance with graphics instructions from the CPU 51, a frame buffer 63 which stores images created by the GPU 62, and an image decoder 64 which decodes graphics data that has been compressed and encrypted by quadrature conversion such as discrete cosine conversion.

The GTE 61 is provided with a parallel calculating mechanism, and is able to perform at high speed coordinate conversion, light source calculation, and computation of matrices and vectors, etc., in accordance with calculation demands from the aforementioned CPU 51. Specifically, this GTE 61, when, for example, performing flat shading whereby 1 triangular polygon is plotted in the same color, is able to perform coordinate calculations of a maximum of approximately 1,500,000 polygons per 1 sec, and by this means, in this entertainment device 1, high-speed coordinate calculation can be performed along with reducing the burden on the CPU 51.

Additionally, the GPU 62 performs applying of polygons, etc., with regard to a frame buffer 63 in accordance with plotting directions from the CPU 51. The GPU 62 is able to perform plotting of polygons at a maximum speed of about 360,000 shapes per second.

Further, the frame buffer 63 is composed of a so-called dual-port RAM, and is able to perform plotting from the GPU 62 or transmission from the main memory and read-out for display simultaneously.

The frame buffer 63 has a capacity of, for example, 1 MB, and is handled as 16-bit matrices composed of 1024 pixels in the horizontal and 512 pixels in the vertical directions. Further, this frame buffer 63, in addition to the display region output as video output, is also provided with a CLUT (color lookup table) region which stores a color lookup table that is referenced when the GPU 62 performs plotting of polygons, etc., and a texture region, which stores textures that undergo coordinate conversion when plotted and are mapped into the polygons, etc., plotted by the GPU 62. The CLUT region and texture region are dynamically modified in accordance with modification, etc., of the display region.

The GPU 62, in addition to the aforesaid flat shading, is able to perform Gouraud shading, in order to determine the color within polygons by interpolation from the apices of the polygons, and texture mapping, whereby a texture stored in the aforesaid texture region is mapped over a polygon. When such Gouraud shading or texture mapping is performed, the GTE 61 is able to perform coordinate calculation at a maximum of about 500,000 polygons per second.

Further, the image decoder 64 is controlled by the CPU 51 so as to decode still images or moving images stored in the main memory 53 and store them in the main memory 53.

Additionally, the image data that has been reproduced is stored in the frame buffer 63 via the GPU 62, and is used as the background of images plotted by the GPU 62.

The sound system 70 comprises an SPU 71 which generates music, sound effects, etc., based on instructions from the CPU 51, a sound buffer 72, in which waveform data, etc., is recorded by this SPU 71, and a speaker 73, which outputs music, sound effects, etc., generated by the SPU 71.

The SPU 71 is provided with an ADPCM (adaptive differential PCM) decoding function which reproduces voice data that has been encoded (ADCPM) making 16-bit voice data as a 4-bit differential signal, for example, a reproduction function, which generates sound effects, etc., by reproducing waveform data stored in the sound buffer 72, a modulation function, which modulates and reproduces waveform data stored in the sound buffer 72, etc.

By providing such functions, the sound system 70 can be used as a so-called sampling sound source, which generates music, sound effects, etc., based on waveform data recorded in the sound buffer 72 in accordance with instructions from the CPU 51.

The optical disk control part 80 comprises an optical disk device 81 which reproduces programs, data, etc., recorded on the optical disk, a decoder 82 which decodes programs, data, etc., that have been recorded with an error correction code (ECC) attached, and a buffer 83 which accelerates the read-out of data from the optical disk by temporarily storing data from the optical disk 81. A sub-CPU 84 is connected to the decoder 82.

Additionally, in addition to the ADPCM data, so-called PCM data obtained by the analog/digital conversion of voice signals is also used as voice data recorded on the optical disk that is read out by the optical disk device 81.

As the ADPCM data, voice data which is recorded representing a 16-bit digital data differential in 4 bits, is decoded by the decoder 82, then supplied to the aforesaid SPU 71, undergoes processing such as digital/analog conversion by the SPU 71, and then is used to drive the speaker 73.

As PCM data, voice data recorded as 16-bit digital data, for example, is decoded by the decoder 82 and used to drive the speaker 73.

Further, the communications control part 90 is provided with a communications control unit 91 which performs control of communications with the CPU 51 through the bus BUS, and the controller connecting part 12 to which the controller 20 that inputs instructions from the user, and memory card insertion parts 8A an 8B, to which a memory card 10 or terminal 100 is connected as an auxiliary memory device for storing game setting data, etc., are provided in the communications control unit 91.

The controller 20 connected to the controller connecting part 12 has, e.g., 16 instruction keys for inputting instructions from the user, and in accordance with instructions from the communications control unit 91, the status of these instruction keys is transmitted approximately 60 times per second to the communications control unit 91 by synchronous communication. The communications control unit 91 then transmits the instruction keys status of the controller 20 to the CPU 51.

By this means, instructions from the user are input to the CPU 51, and the CPU 51 performs processing in accordance with the instructions from the user based on the game program, etc., being executed.

Here, it is necessary to transmit large amounts of image data at high speed in the read-out of programs and in displaying, plotting, etc., of images among the aforesaid main memory 53, GPU 62, image decoder 64, decoder 82, etc.

For this reason, this entertainment device 1 is constituted so as to be able to perform so-called DMA transmission, whereby data is transmitted directly among the aforesaid main memory 53, GPU 62, image decoder 64, decoder 82, etc., by means of control from a peripheral device control part 52, without passing through the aforesaid CPU 51. By this means, the load on the CPU 51 created by data transmission can be alleviated, and high-speed data transmission can be performed.

Further, when it is necessary to store setting data, etc., of a game being executed, the aforesaid CPU 51 transmits the data to be stored to the communications control unit 91, and a communications control unit 91 writes the data from the CPU 51 into a memory card 10 or terminal 100 that has been inserted into the slot of the aforesaid memory card insertion part 8A or memory card insertion part 8B.

Here, the communications control unit 91 incorporates a protection circuit for preventing electrical breakdown. The memory card 10 or terminal 100 is separated from the bus BUS, and can be removed when the device main unit power is ON. Accordingly, when there is no longer enough memory capacity in the memory card 10 or terminal 100, a new memory card can be inserted without switching off the power to the device main unit. Therefore, a new memory card can be inserted without losing game data requiring backup, and necessary data can be written into the new memory card.

Additionally, parallel I/O interface (PIO) 96 and serial I/O interface (SIO) 97 are interfaces for connecting the memory card 10 or terminal 100 with the entertainment device 1.

An entertainment device which uses a CD-ROM type optical disk as the disk memory medium has been described above. The software used when executing a game by the entertainment device 1, which is a device for playback only (reproduction device), is directed towards the case where the game software including this optical disk, in terms of being recorded into this optical disk, is so-called used software or counterfeit software.

In order to prevent the reproduction and thus prevent the creation of the used software or counterfeit software, at least a specific code which is information specific to a disk, pulse data for generating a pulse sequence, and verification data applicable to a pulse sequence corresponding to the disk rotation are recorded in the optical disk. Thus, the protection of legitimate software can be achieved by registering these specific codes, determining whether or not matching has occurred, or determining whether or not the pulse data or verification data match.

As a typical protection mode, the following countermeasure for protection against this type of used software or counterfeit software is cited as one example. In the entertainment device, when an optical disk which is a disk recording medium in this example is played back by means of the reproduction device, i.e., the entertainment device 1, and a specific code recorded in this optical disk has already been registered in the reproduction device, since it can be determined that the specific code recorded on the optical disk and registered in the reproduction device match, this optical disk can be considered to be legitimate software.

Next, when the specific code of the optical disk has not been registered in the reproduction device in playback of the optical disk, verification data recorded in this optical disk and pulse data for obtaining a pulse sequence are generated, and it is determined whether the pulse sequence obtained by rotation and the verification data match. Since this pulse sequence and verification data will match in a new legitimate optical disk, this specific code will be read out and registered in the reproduction device. In other words, the disk can be registered as legitimate software.

After this registration, when the pulse data of the optical disk exists, since it is not subject to legitimate software protection, this pulse data is eliminated.

Moreover, in the playback of the optical disk, by changing the rotational speed in several stages and recording data corresponding to these several stages in the verification data, legitimate software determination with even greater redundancy is possible.

In this way, legitimate software protection can be performed in three layers, the presence or absence of specific code registration, the matching or non-matching of pulse data and verification data, and the matching or non-matching at rotational speeds in multiple stages.

In the legitimate software protection process, specific codes, verification data, and pulse data are recorded into the optical disk, but instances where other processing, e.g., rotation control, specific code discrimination and registration, pulse data pulse sequence detection and pulse sequence discrimination, or pulse data deletion are used in the verification program, or instances where other processing is performed only on the reproduction device side can also be considered.

Here, more detailed description is given including the configuration of the device with regard to the aforesaid legitimate software protection.

Figure 5:
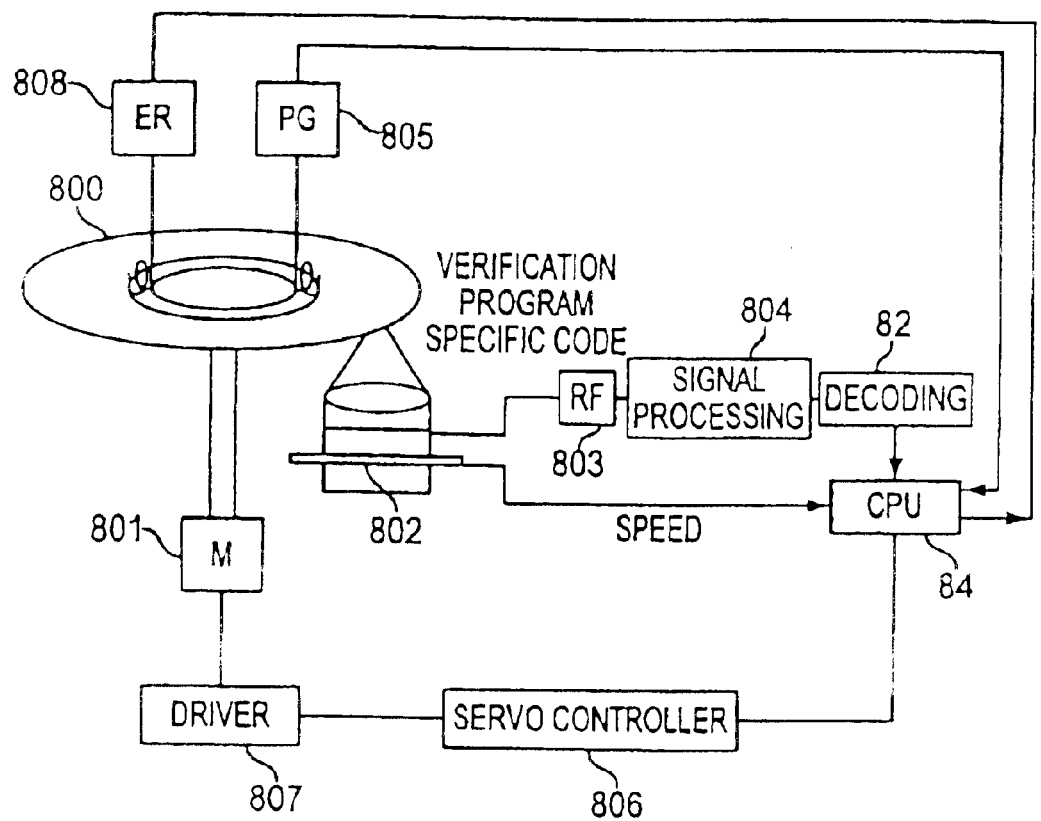
FIG. 5 is a block diagram of the configuration of the device used for legitimate software protection.

First, with respect to the configuration of the optical disk reproduction device, a device relating to security is described referring to FIG. 5. The disk 800 installed in the optical disk device 81 (see FIG. 4) is rotated by a spindle motor 801. Meanwhile, by means of a pickup 802 which obtains a pit signal by moving in the radial direction of the disk 800, an RF signal is input to an RF amplifier 803. Since the decoder 82 is placed at the later stage of the RF amplifier 803, data of the table of contents (TOC), specific codes, or verification data is input via the RF amplifier 803 to a signal processing circuit 804 which exists along with this decoder 82. The output of the signal processing circuit 804 is input to a CPU 84 for control together with the output of a speed detector of the pickup 802 and a PG detection signal obtained by a PG 805, and as a result of processing by the CPU 84, the driving control of the spindle motor 801 is controlled and a deletion circuit 808 is driven via a servo controller 806 and driver 807. In this case, the PG 805 obtains and outputs pulse data (here magnetic data) recorded into the disk 800 and outputs signals from the pickup coil obtained by rotation of the disk.

Figure 6:
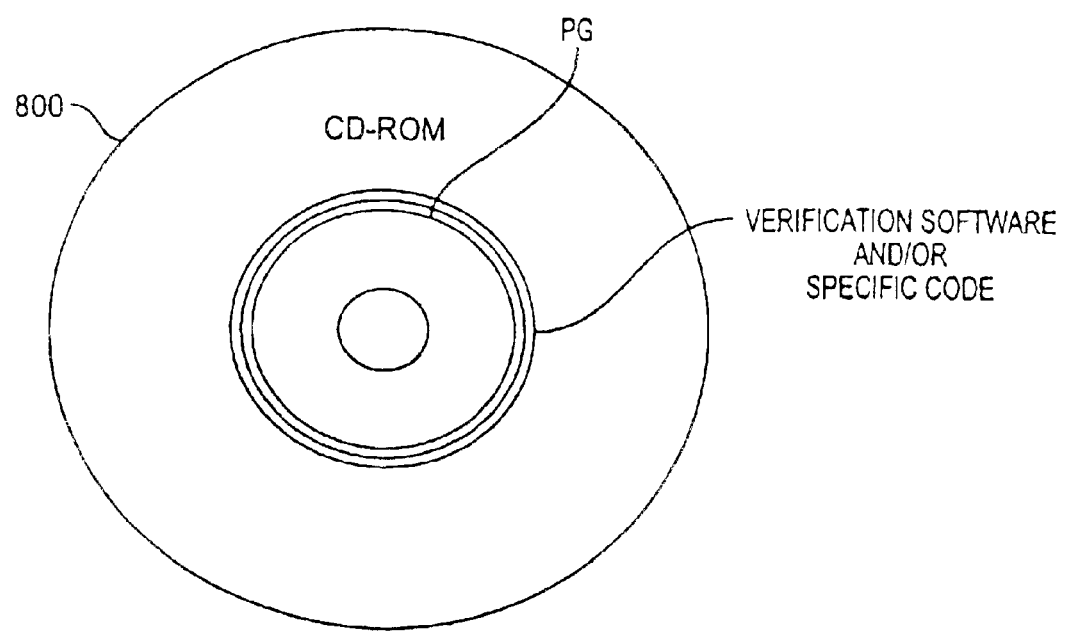
FIG. 6 is a plan view of a CD-ROM.

Here, erasable pulse data is recorded on the front, back, or side of the disk 800 as shown in FIG. 6. For example, this may be formed by applying a bar-code or by applying one or more types of magnetic powder. The pulse data of the bar-code, etc., is made erasable, or the magnetic powder is made demagnetizable. Specifically, by coating a disk rotational track in a specified area near the center of the disk label face with a magnetic material magnetic recording is intermittently performed so that a periodic pulse obtained can be detected by rotation, and this can then be demagnetized by uniform magnetic recording. Additionally, pulse data can be obtained in the form of light, and one or several reflective parts or transmissive parts can be formed by processing on the disk 800. By erasing a portion of the pulse data by means of light, blackening of the light reflecting part, or removing and blackening the light reflecting part attached, or making the transmissive parts perform light-scattering reflection, the discrimination of pulse data can be made impossible.

Further, specific codes can be recorded for each title by means of a nonerasable method on this disk 800. For example, a method may be used whereby a bar-code is placed on the front, back, or side of the disk, or a code can be recorded as a digital signal in a TOC, lead-in area, or a data region optional area, or, additionally, pit deviation (or wobbling of pit) of recording pits can be modulated and input as servo error signals. This specific code can also erasably record the title name, title number, manufacturer's name, production lot, or other specific disk information.

Further, verification data is recorded on the disk 800. This verification data corresponds to the aforesaid pulse data, and data corresponding to the pulse sequence of the pulse data obtained in accordance with a specified rotational speed of the disk is recorded. Accordingly, when the disk 800 is legitimate software, the pulse sequence according to the pulse data obtained in conjunction with rotation of the disk will match the verification data.

When a pulse sequence according to pulse data is obtained by changing the rotational speed of the disk in multiple stages, as described below, verification data can be recorded in accordance with pulse sequences of those multiple stages. Of course, since the pulse sequence generating state of pulse data will vary according to the rotational speed even with a single set rotational speed, the recording state of the verification data corresponding to the pulse sequence will also vary according to the setting state of the rotational speed.

In this way, erasable pulse data, nonerasable specific codes, and verification data can be recorded on the disk 800.

Meanwhile, on the main unit side of the optical disk device, first, a pulse data detection sensor 805 is provided. For example, when the pulse data medium is a magnetic medium, magnetic detection is performed by the placement of a pickup coil, or when light reflection or transmission is used, the pulse sequence is detected by the placement of a photocoupler.

Additionally, the specific code is read, e.g., by the pickup 802, and passes through the RF amplifier 803 and signal processor 804 together with the TOC data and is decoded as necessary, and among these codes it is determined whether the title name and title number are stored, for example, in a COCT (contents on console table) in a non-volatile recording device such as a flash memory, relating to the control CPU 84 in the main unit, or have already been registered.

In addition to the specific code, pulse data, and verification data recorded on the optical disk, a verification program can also be recorded on the optical disk. The verification program may be a rotation control program, which controls the rotational speed of the optical disk as described above, or, in addition to rotation control, may be a program which performs specific code discrimination and registration, pulse sequence detection and discrimination, or pulse data deletion processing. Since the optical disk is originally subject to control which fixes the reproductions regardless of the location of reproduction on the disk 800, the control of the set rotational speed of the disk 800 or rotational speed control in multiple stages may be software control using a verification program or hardware control using a rotational speed control means in the reproduction device. When the rotational speed is the verification program, by downloading this verification program into the main unit side, the disk 800 can be made to rotate at a rotational speed designated in this verification program, and it can be verified whether the pulse sequence designated in the verification data is obtained in accordance with the rotational speed.

Further, the verification program, in addition to a rotational speed control program, may also have a discrimination program for the specific code recorded in the optical disk, a pulse sequence detection program based on pulse data when there is no registration by discrimination of a specific code, a detection pulse sequence and verification data discrimination program, a specific code registration program which uses matching of the pulse sequence and verification data, or a program which deletes pulse data after registration.

At the same time, these processes may be performed using hardware on the reproduction device side.

By registering title specific codes into the COCT and allowing the contents of the table to be read from a designated server using a communication function, it will be possible to obtain with good accuracy marketing information that is useful to future product development and sales.

Figure 7:
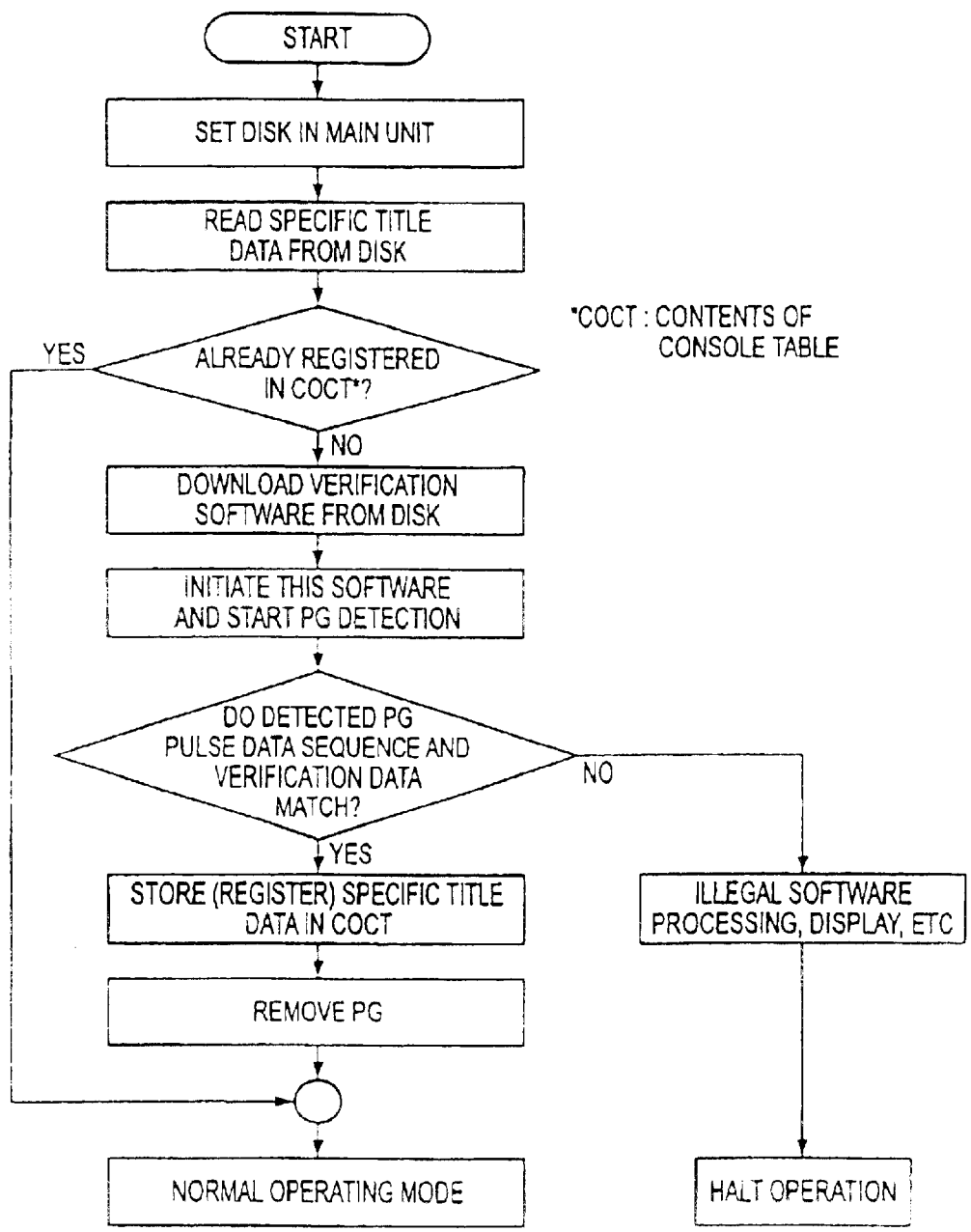
FIG. 7 is a flowchart of the process used for legitimate software protection.
Figure 8A:
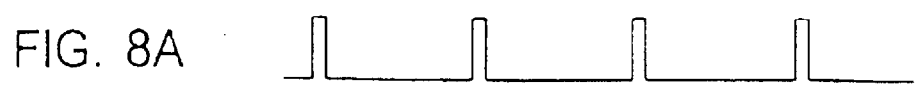
FIG. 8(a–e) is a waveform diagram of a pulse sequence on the disk recording medium used in the entertainment device.
Figure 8B:
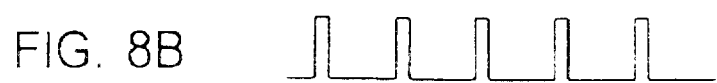
Figure 8C:
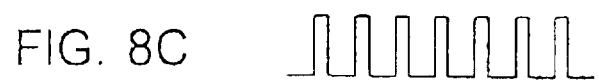
Figure 8D:
Figure 8E:

FIG. 7 shows a legitimate software protection operation. When a user has purchased a new disk or owns a disk, and sets this disk in the reproduction device (main unit), specific data is read on the main unit side, and it is determined whether or not this data has already been registered in the COCT. If as a result of this check it is found that the data has been registered, the main unit shifts automatically to normal operating mode. If the data has not been registered, verification data is downloaded from the disk and the pulse sequence is detected. When the disk rotation is controlled in multiple stages by means of a program, a unique pulse sequence is obtained by the combination of the rotational speed and the pulse sequence accompanying that rotational speed, as shown in FIG. 8.

When this pulse sequence and the verification data match, the main unit determines that the disk is a legitimate disk and stores a portion or all of the code characteristic of the title that has been read out in the COCT, and then the pulse data on this disk is deleted by a deletion device. The deletion mechanism in this case may be the application of a strong magnetic force using a magnetic head incorporated into the disk chucking part, etc. In this way, the pulse data on the disk is erased and becomes unascertainable, but the title information is newly registered in the COCT, and the main unit thereafter shifts to normal operating mode. On the other hand, if the contents of the pulse signal and the verification data prepared for each disk do not match, or the pulse itself cannot be detected, the main unit determines that the disk contains illegitimate software such as pirated software, and after performing the desired positioning, display, etc., halts subsequent operation.

By means of the present invention as described above, the following effects are obtained. Since only titles for which legitimate software has actually been purchased and which have been initially registered in the machine table can be used, resale (so-called used software purchase) after purchase by an end-user becomes practically impossible. When data recorded on a disk is illegally copied in full, since the exact pattern of the verification data cannot be recreated, the manufacture of counterfeit software becomes extremely difficult, and simple copying to a recording medium becomes meaningless. By embedding pulse data, verification data, verification programs, and specific codes in a disk by separate methods, the level of difficulty of counterfeit software manufacturing can be greatly increased. In particular, by switching in multiple stages of disk rotational speed and changing the verification data for each production lot, counterfeit production becomes close to impossible. In this way, since the commerce in used software and counterfeit software can be drastically reduced, legitimate software can be forcefully protected and a healthy software commerce market can be maintained and developed by the present invention. Moreover, by viewing the COCT on the software supplier side using the main unit communication function, marketing data that is useful for future software development and sales can be obtained with good accuracy.

What is claimed is:

1. A disk recording medium adapted for reproduction by a reproduction device, said disk recording medium including:

at least one of software and data;

erasable pulse data adapted to provide said reproduction device with a pulse sequence;

information including a first information component for verification of said pulse sequence and a second information component for specifying said at least one of software and data; and a rotation control program capable of causing said reproduction device to selectively control the rotational speed so as to make the pulse sequence and the first information component match, wherein said pulse sequence corresponds to a rotational speed of said disk recording medium.

2. The disk recording medium according to claim 1, wherein said second information component is obtained from at least one of a plurality of bar code, digital signals, and servo error signals in which a pit deviation is modulated.

3. The disk recording medium according to claim 1, wherein said pulse data is composed of at least one of magnetic data and optical data.

4. The disk recording medium according to claim 1, wherein said second information component is obtained by at least one of bar codes, digital signals, and servo error signals in which a pit deviation is modulated.

5. The disk recording medium according to claim 1, wherein said pulse data is composed of at least one of magnetic data and optical data.

6. The disk recording medium according to claim 1, wherein said rotation control program has a program capable of causing said reproduction device to change stages of the rotational speed; and said first information component includes information adapted for verification of said pulse sequence corresponding to said rotational speed in the stages.

7. The disk recording medium according to claim 1, further including a verification program capable of causing said reproduction device to detect the pulse sequence, to determine whether the pulse sequence and the first information component match, and, when said pulse sequence and said first information component match, to register said second information component in said reproduction device and then delete said pulse data.

8. The disk recording medium according to claim 7, wherein said second information component is obtained by at least one of bar codes, digital signals, and servo error signals in which a pit deviation is modulated.

9. The disk recording medium according to claim 7, wherein said pulse data is composed of at least one of magnetic data and optical data.

10. The disk recording medium according to claim 7, wherein said rotation control program has a program capable of causing said reproduction device to change stages of the rotational speed; and said first information component includes information adapted for verification of said pulse sequence corresponding to said rotational speed in the stages.

11. A reproduction device operable to perform reproduction of a disk recording medium, the reproduction device comprising:

an installation unit operable to install a disk recording medium having at least one of software and data, pulse data adapted to provide said reproduction device with a pulse sequence, and information adapted for verification of said pulse sequence and for specifying said at least one of software and data;

a distinction unit operable to distinguish whether said information of the disk recording medium installed in the installation unit has been registered;

a pulse sequence detection unit operable to detect the pulse sequence, the detection of said pulse sequence being performed only when said information has not been registered;

a rotation control unit operable to selectively control the rotation of said disk recording medium so that the pulse sequence and said information match, wherein said pulse sequence obtained from said pulse data corresponds to a rotational speed of said disk recording medium;

a match discrimination unit operable to discriminate whether said pulse sequence and said information match;

an information registration unit operable to register said information, the registration of said information being performed only when said pulse sequence and said information have matched; and a deletion unit operable to delete said pulse data on said disk recording medium, the deletion of said pulse data being performed when said information has been registered.

12. The reproduction device according to claim 11, wherein said rotation control unit is further operable to control the rotation of said disk recording medium so as to change stages of the rotational speed in accordance with said information.

13. The reproduction device according to claim 11, wherein said information includes:

a first information component for verifying said pulse sequence; and a second information component for specifying said at least one of software and data.

14. A method for performing reproduction of a disk recording medium including at least one of software and data, said disk recording medium being adapted for reproduction by a reproduction device, the method comprising:

recording on said disk recording medium pulse data adapted to provide said reproduction device with a pulse sequence, and information adapted for verification of said pulse sequence and for specifying said at least one of software and data;

reading said information when said disk recording medium has been installed in said reproduction device;

determining whether said information has been registered in said reproduction device;

detecting said pulse sequence only when said information has not been registered;

selectively controlling a rotation of said disk recording medium so that the pulse sequence and said information match, wherein said pulse sequence obtained from said pulse data corresponds to a rotational speed of said disk recording medium;

determining whether said pulse sequence and said information match;

registering said information in said reproduction device only when said pulse sequence and said information have matched; and deleting said pulse data on said disk recording medium when said information has been registered.

15. The reproduction method according to claim 14, wherein the step of controlling a rotation further controls the rotation of said disk recording medium so as to change stages of the rotational speed in conjunction with said information.

16. The reproduction method according to claim 14, wherein said information includes:

a first information component for verifying said pulse sequence; and a second information component for specifying said at least one of software and data.

* * * * *